United States Patent
Uenishi et al.

(10) Patent No.: US 8,110,956 B2
(45) Date of Patent: Feb. 7, 2012

(54) SMALL MOTOR OF QUADRANGULAR EXTERNAL SHAPE

(75) Inventors: Eiji Uenishi, Matsudo (JP); Nobuyuki Nemoto, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 124 days.

(21) Appl. No.: 12/663,092

(22) PCT Filed: Apr. 11, 2008

(86) PCT No.: PCT/JP2008/057144
§ 371 (c)(1),
(2), (4) Date: Dec. 4, 2009

(87) PCT Pub. No.: WO2008/149602
PCT Pub. Date: Dec. 11, 2008

(65) Prior Publication Data
US 2010/0176676 A1    Jul. 15, 2010

(30) Foreign Application Priority Data
Jun. 7, 2007    (JP) .................................. 2007-151531

(51) Int. Cl.
*H02K 21/26* (2006.01)
(52) U.S. Cl. .......... 310/154.21; 310/154.22; 310/154.24
(58) Field of Classification Search ............. 310/154.21, 310/154.22, 154.24, 154.01, 154.25, 154.03, 310/154.08, 154.09
See application file for complete search history.

(56) References Cited

U.S. PATENT DOCUMENTS

| | | | | |
|---|---|---|---|---|
| 4,453,097 A | * | 6/1984 | Lordo ...................... | 310/154.07 |
| 6,927,518 B2 | * | 8/2005 | Tanaka et al. ............ | 310/154.06 |
| 6,987,340 B2 | * | 1/2006 | Kaneshige ............... | 310/154.28 |
| 6,995,488 B1 | * | 2/2006 | Yamashita et al. ....... | 310/154.21 |
| 2004/0061406 A1 | * | 4/2004 | Yokota et al. ............ | 310/216 |
| 2006/0279159 A1 | * | 12/2006 | Kuroda ...................... | 310/216 |
| 2007/0007838 A1 | * | 1/2007 | Kuroda ..................... | 310/154.21 |
| 2010/0072848 A1 | | 3/2010 | Kuroda | |

FOREIGN PATENT DOCUMENTS

| | | | |
|---|---|---|---|
| CN | 1897407 A | | 1/2007 |
| EP | 1727259 A2 | * | 11/2006 |
| JP | 64-12455 | | 1/1989 |
| JP | 07-059322 | | 3/1995 |
| JP | 07059322 A | * | 3/1995 |
| JP | 10201206 A | * | 7/1998 |
| JP | 2005-020914 | | 1/2005 |
| JP | 2005020914 A | * | 1/2005 |
| JP | 2007-006688 | | 1/2007 |
| JP | 2007-037293 | | 2/2007 |
| JP | 2007-104875 | | 4/2007 |

* cited by examiner

*Primary Examiner* — Quyen Leung
*Assistant Examiner* — Alex W Mok
(74) *Attorney, Agent, or Firm* — McGlew and Tuttle, P.C.

(57) ABSTRACT

The side wall of a motor casing is formed into a quadrangular shape such that four flat side portions, and arcuate corner portions located at respective corners are continuously joined together. A field magnet having a quadrangular external shape is formed such that four flat side portions, and four arcuate corner portions located at respective corners are continuously joined together. The arcuate corner portions of the motor casing and the arcuate corner portions of the field magnet extend along respective circles having a center located at the center of a motor shaft, and the central angles of the arcuate corner portions fall within a range of 15° to 35° inclusive. The field magnet is press-fitted or bonded into the motor casing such that the corner portions of the field magnet come into close contact with the corner portions of the motor casing.

18 Claims, 6 Drawing Sheets

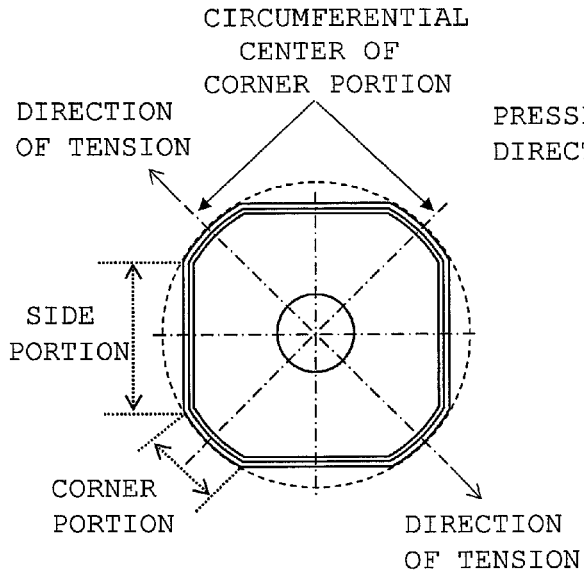
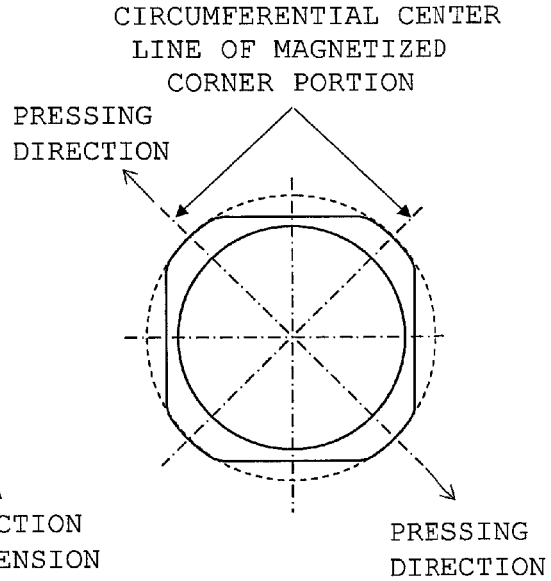
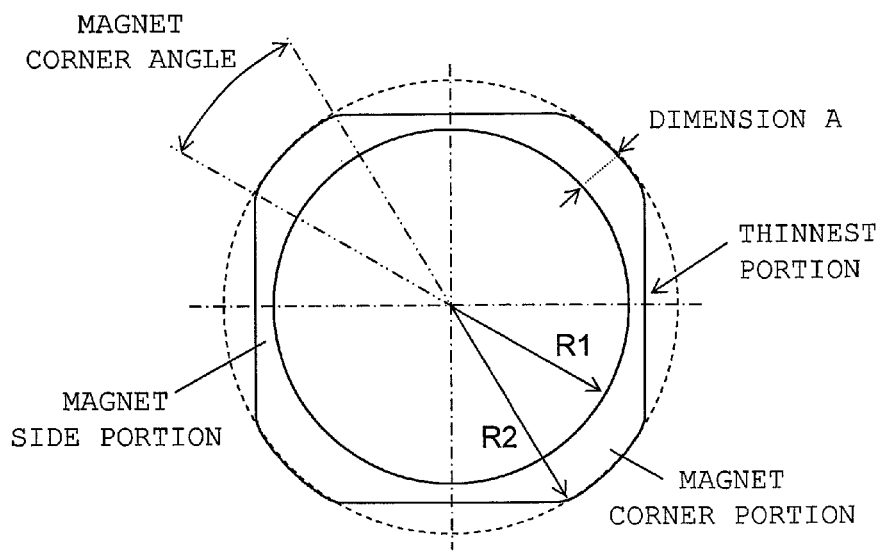

EXAMPLE COMPARISON
TOTAL MAGNETIC FLUXES OF MOTORS

| □18.3, CORE DIA. φ15 | φ20.0, CORE DIA. φ15 |
|---|---|
| TOTAL MAGNETIC FLUX OF MOTOR (Wb) | |
| 2550 | 2510 |

EXAMPLE COMPARISON OF PERFORMANCES OF MOTORS
HAVING THE SAME THICKNESS (TOTAL MAGNETIC FLUX)

| □18.3, CORE DIA. φ15 | φ18.3, CORE DIA. φ13 |
|---|---|
| TOTAL MAGNETIC FLUX OF MOTOR (Wb) | |
| 2550 | 1750 |

<u>QUADRANGULAR MOTOR</u>

(PRESENT INVENTION)

<u>ROUND MOTOR</u>

(PRIOR ART)

SMALL MOTOR OF QUADRANGULAR EXTERNAL SHAPE

TECHNICAL FIELD

The present invention relates to a small motor having a quadrangular external shape which can be used in an air conditioner actuator, a motor-driven retractable mirror, etc., and more particularly to the configuration of a 4-pole field magnet of the small motor and a motor casing of the small motor for mounting the magnet therein.

BACKGROUND ART

In an ordinary small motor, the external surface of its motor casing has a circular shape (round shape) (see FIG. 6(A)). When such a round motor is to be mounted in an apparatus or on a wiring board, a whirl-stop must be employed for preventing rotation of the motor. When the round motor is mounted in an apparatus, the round shape tends to be accompanied by wasted space within the apparatus. Thus, in view of prevention of rotation of a motor in relation to a mounting surface and space efficiency, there is known impartment of a quadrangular or higher polygonal external shape to a motor.

FIG. 8 shows a quadrangular motor having a 4-pole field system modified from a motor having a 6-pole field system described in Patent Document 1. In the illustrated quadrangular motor, the side wall of a motor casing, which serves as a yoke, is formed into a quadrangular shape, and four magnets which serve as four field poles are attached to the respective inner surfaces of side portions of the quadrangular side wall. For the purpose of lowering vibrations of the side portions, the magnets are fixed at the centers of the corresponding side portions. A rotor having six rotor poles is supported rotatably on the interior side of the magnets. Generally, individual magnets are shaped such that the radial clearance between the magnet and the outer circumferential surface of the rotor pole gradually increases from the circumferential center of the magnet toward the circumferentially opposite ends of the magnet so as to gradually weaken the magnetic field intensity, thereby avoiding an abrupt change in the magnetic field intensity, which would otherwise result from rotation of the rotor. Thus, cogging torque can be lowered.

However, in order to lower cogging torque, the individual magnets of FIG. 8 are formed such that the distance between the magnet and the rotor at the circumferentially opposite end portions of the magnet is rendered greater than that at a circumferentially central portion of the magnet. Nonetheless, the circumferentially opposite end portions of the magnet are still thicker than the circumferentially central portion of the magnet, and rendering the distance greater apparently causes deterioration in performance. Furthermore, wasted spaces are formed between the magnets. Thus, disposing the magnets in the respective central regions of the side portions of the yoke raises the following problem: the magnets can be neither reduced in size nor arranged efficiently; consequently, the motor thickness (radial distance between opposed side portions of the quadrangular yoke) is increased, resulting in a failure to reduce the size of the motor.

In order to cope with the above problem, there is known a configuration in which the magnetized portions are disposed at respective corners between side portions of a quadrangular yoke (see Patent Documents 2, 3, and 4). FIG. 9(A) is a sectional view showing a motor which is described in Patent Document 4 and in which the magnetized portions are disposed at the respective corners between the side portions, and FIG. 9(B) is an enlarged view showing one of the four magnetized portions. In FIG. 9(A), the motor casing has a quadrangular section and accommodates therein a 4-pole field magnet magnetized with alternating N and S poles. This field magnet is magnetized such that the centers of magnetic poles are located at the respective corners between the side portions of the yoke. The motor casing has a fixed plate thickness and is shaped such that its corners are crushed inward while the side portions of the quadrangular section are partially left intact; and the magnet is shaped such that its inside has a circular surface and such that its outside is in close contact with a motor frame.

As shown in FIG. 9(B), this magnet is intended to minimize the magnet weight while motor characteristics are retained, by means of optimizing the degree of inward crush of the corners; i.e., the ratio of a dimension L2 of a thickest portion of the magnet to a dimension L1 of a thinnest portion of the magnet, or the ratio of a radius R1 of a corner curvature to an inside radius R2 of the magnet.

In order to improve productivity, desirably, the field magnet of a small motor is manufactured separately from the motor casing (yoke) and is then assembled with the yoke. Usually, such assembly employs a press-fit technique. However, for press-fitting, a relative dimensional tolerance between the motor casing and the magnet must be set strictly. However, since the motor configuration as shown in FIG. 9(A) is designed to crush the corner portions of the quadrangular shape, the center for the inside radius of the magnet and the center for the radius of a corner curvature differ in position. Thus, difficulty is encountered in designing the shape of the yoke and the shape of the magnet to be press-fitted into the yoke and in designing dies or molds for forming such shapes. In order to prevent deterioration in magnetic flux of the motor, close contact must be established between the inside of the yoke and the corner portions of the magnet, particularly, at the apexes of magnetic poles of the magnet at which the magnetic field intensity must be increased. However, when, as shown in FIG. 9(A), the center for the inside radius of the magnet and the center for the radius of a corner curvature differ in position, different references for tolerance are involved for product dimensions. Thus, difficulty is encountered in establishing close contact between the magnet and the motor casing.

Also, desirably, the magnet is reduced in weight for reduction of cost without involvement of deterioration in effective magnetic flux. Further, cogging torque must be lowered. However, the magnet having a complicated shape as shown in FIG. 9(A) encounters difficulty in designing its optimum shape for reducing weight and lowering cogging torque while increasing effective magnetic flux.

[Patent Document 1] Japanese Patent Application Laid-Open (kokai) No. 2005-20914

[Patent Document 2] Japanese Patent Application Laid-Open (kokai) No. H7-59322

[Patent Document 3] Japanese Utility Model Application Laid-Open (kokai) No. S64-12455

[Patent Document 4] Japanese Patent Application Laid-Open (kokai) No. 2007-6688

DISCLOSURE OF THE INVENTION

Problems to be Solved by the Invention

A small motor having a quadrangular external shape has four flat portions and corner portions, which connect the adjacent flat portions, and is required to establish, particularly at the corner portions, close contact between a motor casing and a magnet located on the interior side of the motor casing.

Thus, difficulty is encountered in designing and manufacturing the magnet, the motor casing, and dies or molds therefor.

An object of the present invention is, in a small motor having a quadrangular external shape employed in view of whirl-stop and space efficiency, to reduce the weight and volume of a field magnet; efficiently dispose the field magnet; lower cogging torque; and reduce the motor size without involvement of deterioration in motor performance.

Also, an object of the present invention is to facilitate optimum shape design for the magnet for imparting, to the magnet, such a shape as to enable accurate attachment of the magnet to the inside of a yoke while improving motor performance by causing the magnet to produce effectively functioning magnetic flux; increasing effective magnetic flux of and reducing the weight of the magnet; and lowering cogging torque.

Means for Solving the Problems

The present invention provides a small motor having a quadrangular external shape in which a 4-pole field magnet is attached to an inner peripheral surface of a motor casing made of metal. A side wall of the motor casing is formed into a quadrangular shape such that four flat side portions, and arcuate corner portions equal in number to the four side portions and located at respective corners between the side portions are continuously joined together. The field magnet has a circular inner peripheral surface having a diameter slightly greater than an outside diameter of a rotor, and a quadrangular external shape. The field magnet having the quadrangular external shape is formed such that four flat side portions, and arcuate corner portions equal in number to the four side portions and located at respective corners between the side portions are continuously joined together. The arcuate corner portions of the motor casing and the arcuate corner portions of the field magnet extend along respective circles having a center located at a center of a motor shaft, and central angles of the arcuate corner portions fall within a range of 15° to 35° inclusive. The field magnet is press-fitted or bonded into the motor casing such that the corner portions of the field magnet come into close contact with the corner portions of the motor casing.

The positions of respective circumferential centers of the corner portions of the motor casing coincide with those of the corresponding corner portions of the field magnet and apexes of magnetic poles of the field magnet are located at the respective positions of the circumferential centers. A center between the opposed corner portions of the motor casing and a center between the opposed side portions of the motor casing coincide with the center of the motor shaft, and a center for an outside radius of and a center for an inside radius of the corner portions of the magnet coincide with the center of the motor shaft. The field magnet having the quadrangular external shape is integrally formed into an overall shape of a ring and is magnetized such that S and N poles alternate in a circumferential direction.

EFFECT OF THE INVENTION

According to the present invention, portions of the motor casing (yoke) and portions of the magnet coincide in dimensional center. Thus, components of dies or molds can be readily fabricated, and there can be readily obtained a reference for accuracy in establishing the coincidence between the center for the inside radius of a bearing of the yoke and the center for the inside radius of a bearing of an end bell in assembly of the motor.

Also, the present invention enables optimum design for the cross-sectional area (cost) of the magnet, the magnetic flux of the motor, and cogging torque by means of setting the corner angle of the magnet having four flat portions and corner portions, which connect the adjacent flat portions, to a value of 15° to 35° inclusive.

BRIEF DESCRIPTION OF THE DRAWINGS

FIGS. 3(A) and 3(B) are side views showing the motor casing and a magnet, respectively.

FIG. 4 is a view for explaining the shape of the magnet.

BEST MODE FOR CARRYING OUT THE INVENTION

Figure 1:
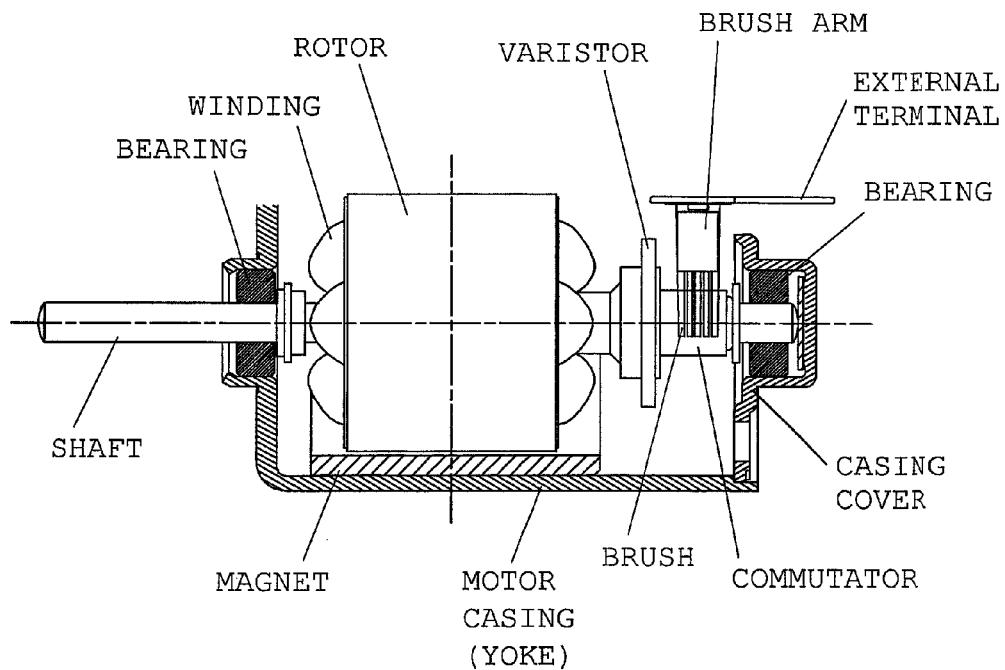
FIG. 1 is a longitudinal, partially sectional view showing the configuration of a small motor having quadrangular external shape which embodies the present invention.
Figure 2:
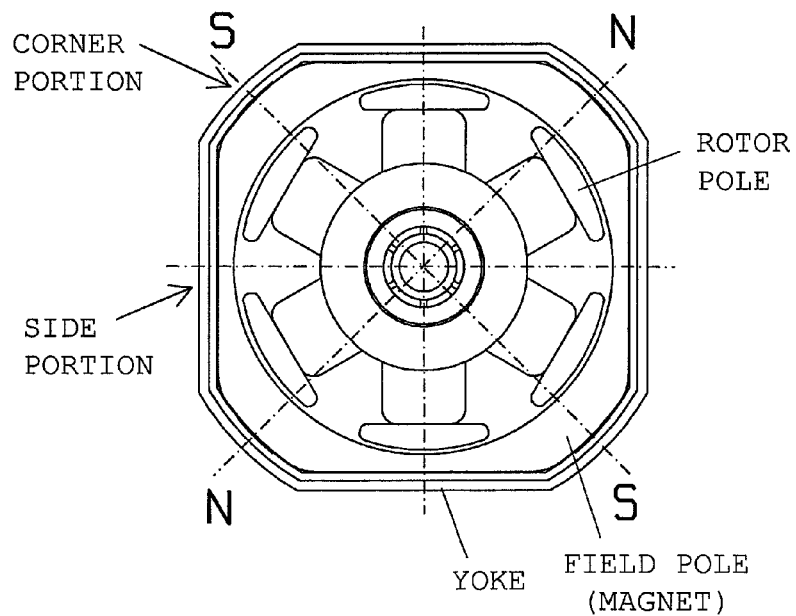
FIG. 2 is a side view of the motor shown in FIG. 1 as viewed from the commutator side with a casing cover removed.

The present invention will now be described by way of example. FIG. 1 is a longitudinal, partially sectional view showing the configuration of a small motor having a polygonal external shape which embodies the present invention. FIG. 2 is a side view of the motor shown in FIG. 1 as viewed from the commutator side with a casing cover removed. A small motor having a 4-pole field magnet and six rotor poles will be described below. However, the present invention may be applied to a small motor which has four or more field poles (e.g., four poles, six poles, or eight poles) and three or more rotor poles.

As illustrated, the magnet is attached to the inner circumferential surface of a motor casing, which is formed from a metallic material into a closed-bottomed tubular shape by press working. A polygonal side wall of the motor casing made of metal serves as a yoke, which, in turn, serves as a magnetic path of the magnet. A casing cover is fitted to an opening portion of the motor casing. A shaft of a rotor is supported by bearings provided respectively at a central portion of the casing cover and at the center of a bottom portion of the motor casing. A rotor configured on the shaft includes a rotor pole structure, which is composed of a pole core and windings wound on the pole core. A commutator is fixed on the shaft and has a varistor at an end portion thereof for quenching sparks. Brushes (a pair) in contact with the commutator are supported by the casing cover via respective brush arms and are externally supplied with power via respective external terminals connected to the brush arms.

FIGS. 3(A) and 3(B) are side views showing the motor casing and the magnet, respectively. The magnet is radially magnetized and has four poles such that N and S poles alternate in the circumferential direction. The illustrated magnet is integrally formed from a magnet material into the overall shape of a ring. This ring-shaped magnet has an inside diameter slightly greater than the outside diameter of the rotor and has nonuniform thickness such that side portions thereof are thin-walled, whereas corner portions thereof are thick-walled. Such a magnet may be formed as follows. A magnetic material is integrally formed into a ring shape having nonuniform thickness; the ring-shaped magnetic material is fixed into the motor casing; and then, by use of a magnetic-field generator, the ring-shaped magnetic material is magnetized from the outside of the motor casing or the inside of the magnet fixed into the motor casing so as to have four magnetized portions (poles). Alternatively, a magnet may be fixed into the motor casing, after the magnetic material is magnetized by use of a magnetic-field generator.

As illustrated, the side wall of the motor casing, the side wall serving as a yoke, is configured such that four flat side portions (flat portions) equal in number to four field poles, and four corner portions equal in number to the four side portions and located at respective corners between the side portions are continuously joined together. The corner portions fixedly support the magnet at the inner sides of the corner portions and each assume an arcuate shape. Since the side portions are formed flat, the side portions function as a whirl-stop in the course of mounting of the motor, and also wasted space around the outer peripheral surface of the motor is reduced, thereby improving space efficiency.

As illustrated, the positions of the circumferential centers of the magnetized portions (apexes of field poles) coincide with those of the corresponding corner portions of the yoke. Also, the center between the opposed corner portions of the yoke and the center between the opposed side portions of the yoke coincide with the center of the motor shaft, and the center for the outside radius of and the center for the inside radius of the corner portions of the magnet coincide with the center of the motor. By means of establishing the coincidence between the center of the motor shaft (thus, the centers of bearings) and the centers of various portions as mentioned above, the assembly of the motor is facilitated.

Referring to FIG. 4, the shape of the magnet will be described. Four magnetized portions which are continuously joined together have a predetermined inside radius R1, and, within the range of the corner angle of the magnet, the outline of the magnet is on an arc having a predetermined radius R2. That is, the corner angle of the magnet is the central angle of the arcuate corner portion. The corner portions of the motor casing to which the corner portions of the magnet are attached also have the same corner angle as that of the magnet.

The magnet has a substantially fixed, radial thickness (dimension A) as measured at any circumferential position of the corner portions. The flat side portions of the magnet each have, as an outline, a straight line which connects the ends of the arcuate corner portions. Thus, the radial thickness of the magnet decreases from a region corresponding to each corner portion toward the adjoining magnetic poles, and becomes the thinnest at the halfway positions toward the adjoining magnetic poles. The side portions of the magnet are not in contact with the side portions of the yoke through provision of a small clearance therebetween. The magnet assumes the overall shape of a ring whose inside diameter is slightly greater than the outside diameter of the rotor; however, the ring shape is such that its side portions are thin-walled, whereas its corner portions are thick-walled. No pressing force acts between the yoke and the side portions of the ring magnet, thereby preventing cracking or chipping of the magnet. Since the magnet has a nonuniform radial thickness as mentioned above, the magnetic flux of the magnet smoothly reduces at the side portions of the magnet as the circumferential distance from the circumferential centers of the corner portions of the magnet increases, whereby cogging torque can be lowered. At the same time, at the circumferential centers of the magnetized corner portions, the magnet has such a thickness as to generate a sufficient magnetic field, and the magnet is pressed closely against the yoke, whereby the intensity of magnetic field can be enhanced for improving motor performance.

Any conventionally used material, such as a ferrite magnet, a neodymium magnet, or a plastic magnet, may be used as material for the magnet. Even when any of these materials is used, the magnet is the most expensive component among the components of a small motor. Thus, in order to reduce cost, the cross-sectional area (thus, weight) of the magnet must be restrained. In order to increase the magnetic flux (thus, torque) of the motor within a limited space, the cross-sectional area of the magnet must be efficiently increased. Also, cogging torque, which is related to an increase in machine noise, must be restrained for implementation of a quiet motor.

Figure 5:
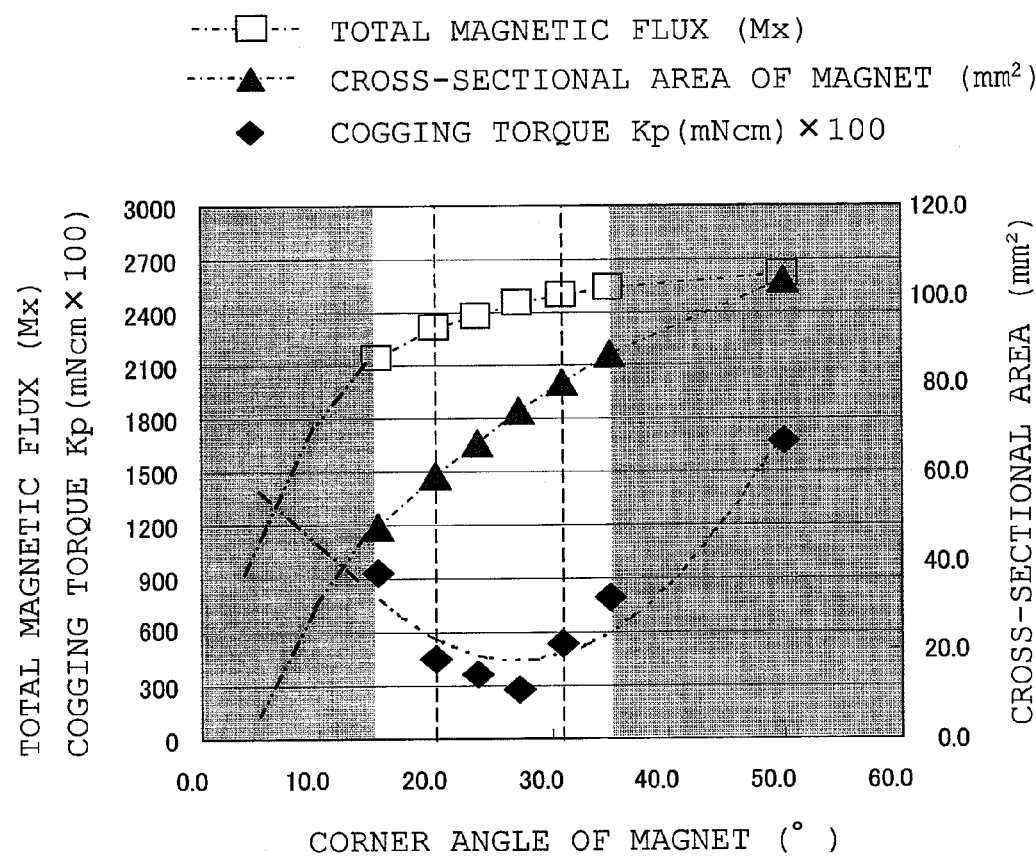
FIG. 5 is a graph showing a change in total magnetic flux (Mx), cogging torque Kp (mNcm×100), and the cross-sectional area of the magnet with a change in the corner angle of the magnet.

FIG. 5 is a graph showing a change in total magnetic flux (Mx), cogging torque Kp (mNcm×100), and the cross-sectional area of the magnet with a change in the corner angle of the magnet. As is apparent from the graph, as the corner angle of the magnet increases, the cross-sectional area (thus, cost) of the magnet increases; however, in spite of the increase, the magnetic flux of the motor does not increase much. Further, cogging torque, which is related to an increase in machine noise, increases greatly at a corner angle of the magnet of 35° or greater, resulting in a failure to implement a quite motor. By contrast, as the corner angle of the magnet is reduced for reducing the cross-sectional area of the magnet, a portion of the magnet whose magnetic flux is effectively used reduces in area, resulting in a failure to obtain sufficient magnetic flux of the motor. Particularly, at a corner angle of the magnet of 15° or less, a portion of the magnet whose magnetic flux is effectively used significantly reduces in area; consequently, the motor fails to obtain magnetic flux required for exhibiting target performance, and also cogging torque increases. Thus, desirably, the corner angle of the magnet falls within a range of 15° to 35° inclusive. More desirably, as is apparent from the graph, the corner angle of the magnet falls within a range of 20° to 32° inclusive, whereby considerably intense total magnetic flux is obtained, and cogging torque lowers more.

Figures 6A, 6B, 6C:
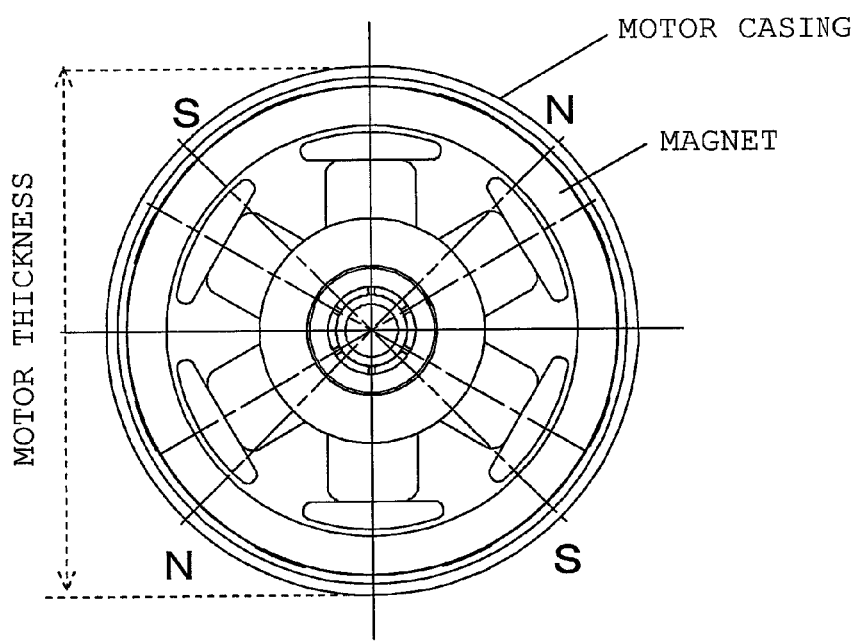
FIG. 6(A) is a sectional view showing a conventional small motor.
FIG. 6(B) is a table showing the result of comparison between total magnetic fluxes of the two motors.
FIG. 6(C) is a table comparing total magnetic fluxes generated from the magnet.

Since the magnet has a nonuniform radial thickness, the small motor of the present invention can attain compatibility between enhancement of performance and lowering of cogging torque, which are conventionally of contradictory techniques. This will be further described in contrast with prior art with reference to FIGS. 6(A), 6(B) and 6(C). FIG. 6(A) is a sectional view showing a conventional small motor having a circular external shape (round shape) for comparison with the small motor of the present invention. As mentioned previously, the magnet of the present invention has a nonuniform thickness such that the magnet has a substantially fixed thickness (dimension A) at the circumferential center of each corner portion, and has a smaller thickness (see FIG. 4) at the opposite ends of each corner portion. By contrast, the field magnet shown in FIG. 6(A) has a fixed thickness along the circumferential direction.

FIG. 6(B) is a table showing the result of comparison between total magnetic fluxes of the two motors. In the drawing, "□18.3" indicates that the quadrangular motor (present invention) has a thickness of 18.3 mm, and "φ20.0" indicates that the round motor (prior art) shown in FIG. 6(A) has a diameter (motor thickness) of 20.0 mm. "Core dia. φ5" indicates that the rotor pole core has a diameter of 15 mm, and the two motors have the same configuration. As is apparent from the table, the motor of the present invention exhibits an increase of about 2% in total magnetic flux generated from the magnet; however, the radial thickness can be reduced to 18.3 mm in contrast to 20.0 mm of the round motor.

FIG. 6(C) is a table comparing total magnetic fluxes generated from the magnet under the condition that the thickness of the quadrangular motor (present invention) and the diameter of the round motor (prior art) are set to 18.3 mm. As is apparent from the table, as compared with the round motor, the present invention exhibits an increase of 30% in total magnetic flux and enables an increase in the usable diameter of the rotor pole core. Increasing the core diameter increases the space factor of the core, so that counter electromotive force increases further. That is, as compared with a conventional round motor having equivalent performance, the motor of the present invention can reduce weight and volume by half, can cut down the usage of magnet material by 10%, and can reduce the motor diameter by 8.5%.

Figure 7A:
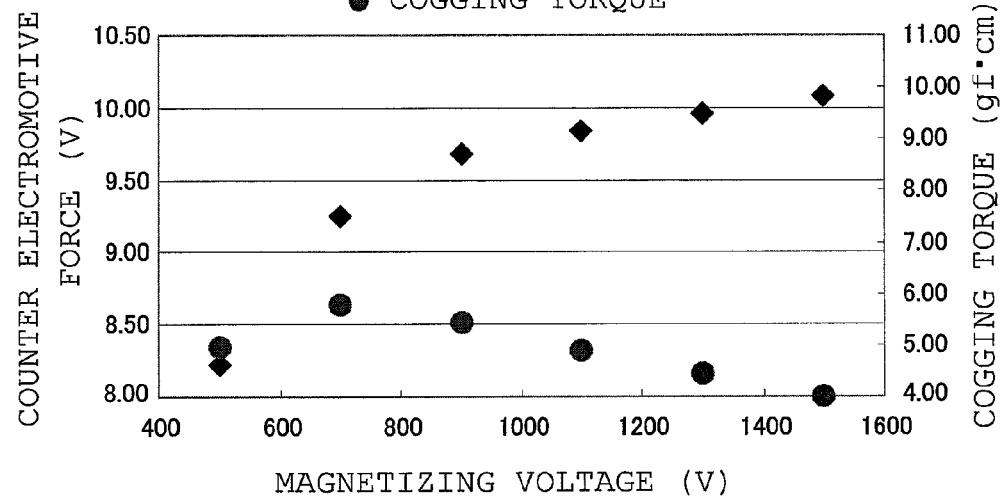
FIGS. 7(A) and 7(B) are a pair of graphs showing, for comparison, 7(A) the performance of the quadrangular motor (present invention) and 7(B) the performance of the round motor (prior art).
Figure 7B:
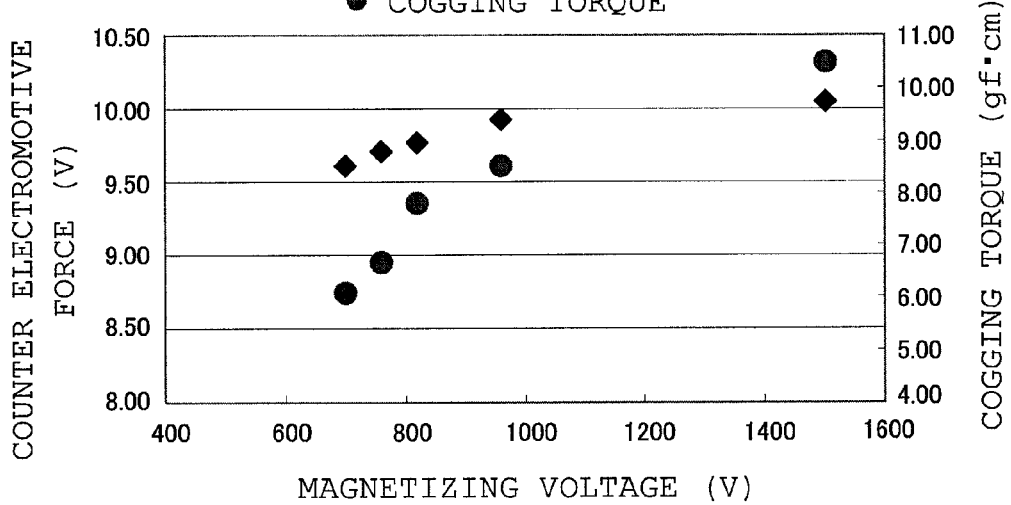
Figure 8:
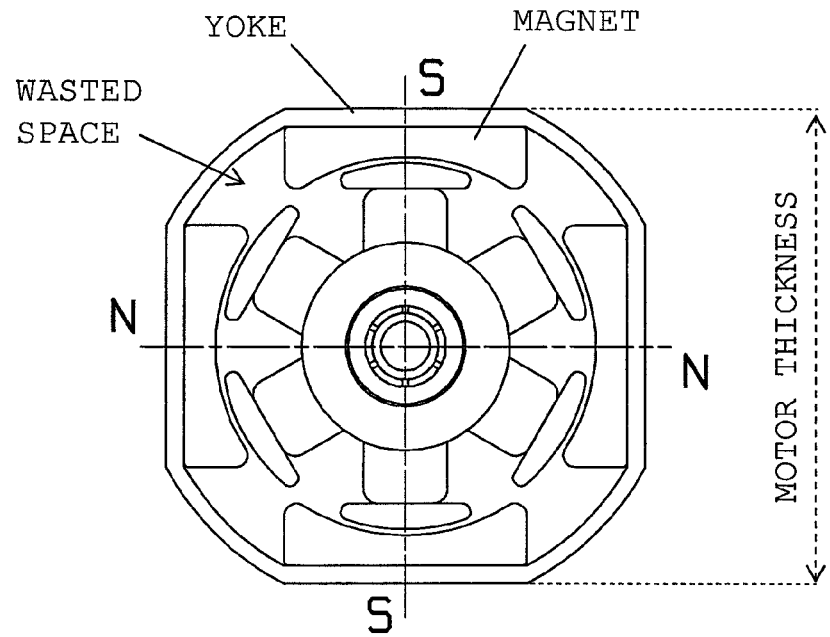
FIG. 8 shows a quadrangular motor having a 4-pole field system modified from a motor having a 6-pole field system described in Patent Document 1.
Figure 9A:
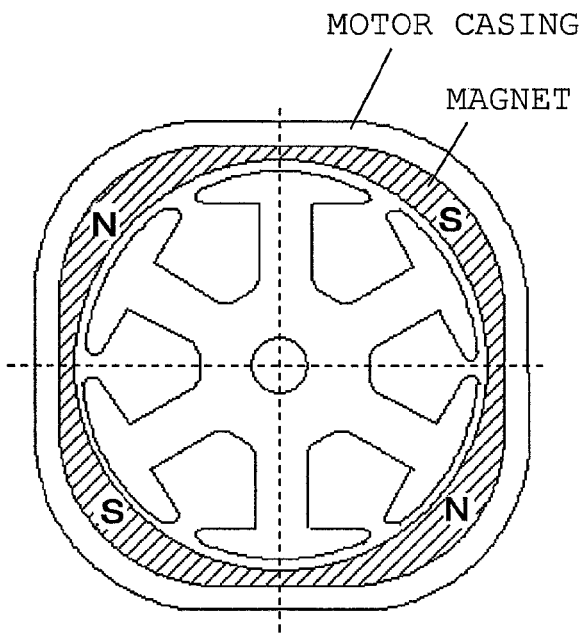
FIG. 9(A) is a sectional view showing a motor which is described in Patent Document 4 and in which the magnetized portions are disposed at the respective corners between the side portions.
Figure 9B:
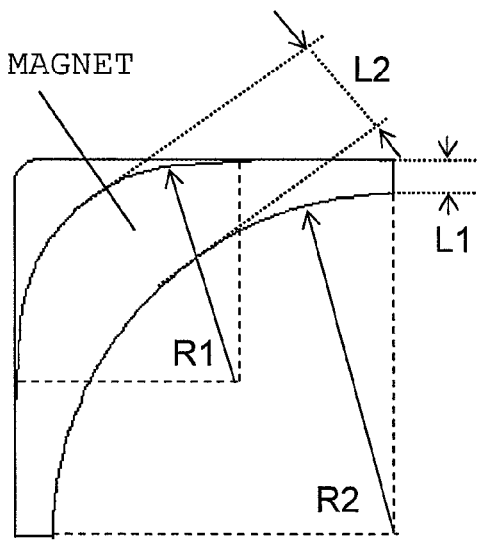
FIG. 9(B) is an enlarged view showing one of the four magnetized portions.

FIGS. 7(A) and 7(B) are a pair of graphs showing, for comparison, 7(A) the performance of the quadrangular motor (present invention), and 7(B) the performance of the round motor (prior art) as shown in FIG. 6(A). In the graphs, the horizontal axis represents magnetizing voltage, and the vertical axis represents counter electromotive force (V) and cogging torque (gf·cm). As counter electromotive force increases, torque increases, and the speed of rotation can be lowered. The magnetizing voltage is a voltage to be applied to the coil of a magnetizing apparatus for magnetizing, after fixation of a magnet material formed into a predetermined shape into the motor casing, the material from the outside of the motor casing or from the inside of the magnet fixed to the motor casing. Alternatively, the magnetizing voltage is a voltage to be applied to the coil of a magnetizing apparatus for magnetizing the magnet alone. For example, in the case of using the magnet formed through magnetization at a voltage of 1,500 (V), the present invention exhibits a drop of 60% or more in cogging torque; specifically, a drop from 10.5 (gf·cm) to 4.0 (gf·cm), without involvement of impairment in performance (counter electromotive force remains substantially unchanged).

The invention claimed is:

1. A small motor having a quadrangular external shape in which a 4-pole field magnet is attached to an inner peripheral surface of a motor casing made of metal, the motor comprising:
a motor casing structure having a side wall formed into an overall shape of a quadrangle such that four flat side portions and arcuate corner portions equal in number to the four side portions and located at respective corners between the side portions are continuously joined together; and
a field magnet structure having a circular inner peripheral surface having a diameter slightly greater than an outside diameter of a rotor and a quadrangular external shape, the quadrangular external shape being formed such that four flat side portions and arcuate corner portions equal in number to the four side portions and located at respective corners between the side portions are continuously joined together, wherein the arcuate corner portions of the motor casing and the arcuate corner portions of the field magnet extend along respective circles having a center located at a center of a motor shaft, and central angles of the arcuate corner portions fall within a range of 15° to 35° inclusive.

2. A small motor having a quadrangular external shape according to claim 1, wherein the positions of respective circumferential centers of the corner portions of the motor casing structure coincide with respective circumferential centers of the corresponding corner portions of the field magnet structure, and apexes of magnetic poles of the field magnet structure are located at the respective positions of the circumferential centers.

3. A small motor having a quadrangular external shape according to claim 1, wherein a center between the opposed corner portions of the motor casing structure and a center between the opposed side portions of the motor casing structure coincide with the center of the motor shaft, and a center for an outside radius of the corner portions and a center for an inside radius of the corner portions of the magnet coincide with the center of the motor shaft.

4. A small motor having a quadrangular external shape according to claim 1, wherein the field magnet structure having the quadrangular external shape is integrally formed into an overall shape of a ring and is magnetized such that S and N poles alternate in a circumferential direction.

5. A small motor having a quadrangular external shape according to claim 4, wherein the positions of respective circumferential centers of the corner portions of the motor casing structure coincide with positions of respective circumferential centers of corresponding corner portions of the field magnet structure, and the corner portions of the motor casing structure fixedly support the field magnet structure at the inner sides of the corner portions of the motor casing structure, wherein a clearance is defined between said side portions of the field magnet structure and the side portions of the motor casing structure, the side portions of the field magnet structure not being in contact with the side portions of the motor casing structure.

6. A small motor in accordance with claim 1, wherein said central angle of each of said four motor casing arcuate corner portions is an angle of an outer curved surface of said motor casing extending between one portion of one of said motor casing arcuate corner portions and another portion of said one of said motor casing arcuate corner portions with respect to the center of the motor shaft, said central angle of each of said four magnet arcuate corner portions being an angle of an outer curved surface of said magnet extending between one portion of one of said magnet arcuate corner portions and another portion of another one of said magnet arcuate corner portions with respect the center of the motor shaft.

7. A small motor, comprising:
a motor casing comprising an inner peripheral surface and a side wall, said side wall comprising four motor casing flat side portions and four motor casing arcuate corner portions, said four motor casing flat side portions being continuously joined with said four motor casing arcuate corner portions, each of said four motor casing arcuate corner portions being located between one of said four motor casing side portions and another one of said four motor casing side portions at a corner portion of said side wall, said side wall having a quadrangle shape;
a four-pole field magnet attached to said inner peripheral surface of said motor casing, said four-pole field magnet having a circular inner peripheral surface, said circular inner peripheral surface having a diameter greater than an outside diameter of a rotor, said circular inner peripheral surface having a quadrangular external shape, said four-pole field magnet comprising four magnet flat side portions and four magnet arcuate corner portions, each of said four magnet arcuate corner portions defining at least a portion of a corner of said four-pole field magnet, each of said four magnet arcuate corner portions being located between one of said four magnet side portions and another one of said four magnet side portions, said four magnet flat side portions being continuously joined with said four magnet arcuate corner portions, the four motor casing arcuate corner portions and said four magnet arcuate corner portions extending along respective circles having a center located at a center of a motor shaft, wherein central angles of the four motor casing arcuate corner portions and said four magnet arcuate corner portions are within a range of 15 ° to 35 ° inclusive.

8. A small motor in accordance with claim 7, wherein a position of a circumferential center of each of said motor casing corner portions coincide with a position of said a circumferential center of one of said magnet corner portions, and an apex of each of said four poles of said field magnet is located at said circumferential center of one of said magnet corner portions.

9. A small motor in accordance with claim 7, wherein each of said motor casing corner portions being opposite another one of said motor casing corner portions, each of said motor casing flat side portions being opposite another one of said motor casing flat side portions, wherein a center between opposite motor casing flat side portions coincides with the center of the motor shaft, and a center for an outside radius of the magnet corner portions and a center for an inside radius of the magnet corner portions coincide with the center of the motor shaft.

10. A small motor in accordance with claim 7, wherein said field magnet is integrally formed into a shape of a ring, said field magnet being magnetized such that S and N poles alternate in a circumferential direction.

11. A small motor in accordance with claim 10, wherein a position of a circumferential center of each of said motor casing corner portions coincides with a circumferential center of one of said magnet corner portions, each of said motor casing corner portions having an inner surface portion, said inner surface portion being contact with one of said magnet arcuate corner portions, each of said magnet side portions being located at a spaced location from one of said motor casing flat side portions.

12. A small motor in accordance with claim 7, wherein said central angle of each of said four motor casing arcuate corner portions is an angle of an outer curved surface of said motor casing extending between one portion of one of said motor casing arcuate corner portions and another portion of said one of said motor casing arcuate corner portions with respect to the center of the motor shaft, said central angle of each of said four magnet arcuate corner portions being an angle of an outer curved surface of said magnet extending between one portion of one of said magnet arcuate corner portions and another portion of another one of said magnet arcuate corner portions with respect the center of the motor shaft.

13. A small motor, comprising:
a motor casing comprising an inner peripheral surface and a side wall, said side wall comprising four motor casing flat side portions and four motor casing arcuate corner portions, said four motor casing flat side portions being continuously joined with said four motor casing arcuate corner portions, each of said four motor casing arcuate corner portions being located between one of said four motor casing side portions and another one of said four motor casing side portions at a corner portion of said side wall, said four motor casing arcuate corner portions and said four motor casing flat side portions defining a quadrangle shape of said motor casing;
a four-pole field magnet connected to said inner peripheral surface of said motor casing, said four-pole field magnet comprising four magnet flat side portions and four magnet arcuate corner portions, said four magnet flat side portions being connected with said four magnet arcuate corner portions, said four magnet flat side portions and said four magnet arcuate corner portions defining a circular inner peripheral surface of said four-pole field magnet, said circular inner peripheral surface having a diameter greater than an outside diameter of a rotor, said four magnet flat side portions and said four magnet arcuate corner portions defining a quadrangular external shape of said magnet, each of said four magnet arcuate corner portions defining at least a portion of a corner of said four-pole field magnet, each of said four magnet arcuate corner portions being located between one of said four magnet side portions and another one of said four magnet side portions, each of said four motor casing arcuate corner portions having a motor casing curved outer surface extending in a motor casing circumferential direction with respect to a center of a motor shaft, each of said four magnet arcuate corner portions having an magnet outer curved surface extending in a magnet circumferential direction with respect to the center of the motor shaft, each of said four magnet arcuate corner portions having a corner magnet angle, each of said four motor casing arcuate corner portions having a corner motor casing angle, said corner magnet angle being defined as an angle of said magnet outer curved surface with respect to the center of the motor shaft, said corner motor casing angle being defined as an angle of said motor casing outer curved surface with respect to the center of the motor shaft, said corner motor casing angle and said corner magnet angle being within a range of 15 ° to 35 ° inclusive.

14. A small motor in accordance with claim 13, wherein a position of a circumferential center of each of said motor casing corner portions coincide with a position of said a circumferential center of one of said magnet corner portions, and an apex of each of said four poles of said field magnet is located at said circumferential center of one of said magnet corner portions.

15. A small motor in accordance with claim 13, wherein each of said motor casing corner portions being opposite another one of said motor casing corner portions, each of said motor casing flat side portions being opposite another one of said motor casing flat side portions, wherein a center between opposite motor casing flat side portions coincide with the center of the motor shaft, and a center for an outside radius of the magnet corner portions and a center for an inside radius of the magnet corner portions coincide with the center of the motor shaft.

16. A small motor in accordance with claim 13, wherein said field magnet is integrally formed into a shape of a ring, said field magnet being magnetized such that S and N poles alternate in a circumferential direction.

17. A small motor in accordance with claim 16, wherein a position of a circumferential center of each of said motor casing corner portions coincides with a circumferential center of one of said magnet corner portions, each of said motor casing corner portions having an inner surface portion, said inner surface portion being contact with one of said magnet arcuate corner portions, each of said magnet side portions being located at a spaced location from one of said motor casing flat side portions.

18. A small motor in accordance with claim 13, wherein each of said motor casing arcuate portions is in contact with an adjacent one of said magnet arcuate corner portions, each of said magnet side portions being located at a spaced location from one of said motor casing flat side portions.

* * * * *